Patented Nov. 6, 1951

2,574,168

UNITED STATES PATENT OFFICE 2,574,168

METHOD OF COATING POROUS MASONRY TO RENDER IT WATER REPELLENT

Bayard R. Brick, St. Louis, Mo., assignor to Walter Wurdack, St. Louis, Mo.

No Drawing. Application January 19, 1950, Serial No. 139,533

1 Claim. (Cl. 117—123)

This invention relates to a method of treating masonry and more particularly to a treatment of porous masonry to render it water repellent.

This application is a continuation-in-part of my copending application, Serial No. 760,706, filed July 12, 1947, now abandoned.

Among the several objects of this invention may be noted the provision of a process for making masonry water repellent which is effective in holding out water even from cracks and pores of appreciable size; the provision of a method for making masonry water repellent which does not appreciably alter the color or appearance of the material treated; the provision of a masonry treatment of the class described which will remain effective for an extended period of time under severe weather conditions; the provision of a method for rendering masonry water repellent which will permit the free egress of water vapor; the provision of a masonry treatment of the class indicated that is effective in suppressing efflorescence and staining; the provision of a method of rendering masonry water repellent which permits abrading the surface of the material treated without affecting the water repellent qualities of such matter; the provision of a method of making masonry water repellent which is economical, dependable, and effective in operation; and the provision of treated masonry which possesses the aforementioned desirable properties. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claim.

Water absorption by the various masonry building materials causes untold damage every year to home, agricultural and industrial structures. Such damage results from various effects of water absorption, such as water penetration into the interior of structures; masonry joint failure through spalling, leeching, solubilizing and salt crystallization; efflorescence or crust formation; and, staining by rust, green verdigris and soot. Such damage may be greatly reduced and even substantially eliminated by proper treatment of the masonry to repel the water in accordance with the present invention.

Either of two basic methods are used to render masonry water repellent. One of these is by filling or plugging the pores of the masonry, while the other is by coating the pores or capillaries with a film which will not wet with water.

The first method if successful, traps within the structure any moisture introduced with the treatment or that was present before treatment or that may enter from another source. Also such treatment fails when an appreciable opening is formed by shrinkage of the applied material due to drying out, aging or weathering. The second method has the disadvantages of usually requiring several coats of repellent material to provide deep enough penetration; the formation of sticky films which collect and hold dirt, soot and other foreign matter; and, utilizing materials which are deleteriously affected by weathering due to the ultra-violet rays of sunlight, heat, cold and the sulfuric and sulfurous acids present in most city atmospheres. Such materials commonly become inoperative in about eighteen months. These disadvantages have hitherto prevented the effective treatment of masonry to obtain water repellency.

An effective water repellent threatment must: prevent the entry of water even into cracks and pores of appreciable size; remain effective for an extended period of time such as five years or more, under the most severe weather conditions; be easy and economical to apply and be fully effective in a one coat application by either brushing or spraying; not change the color, shade or texture of the masonry nor produce a glossy surface; not change the appearance of the masonry at any subsequent time due to weathering; not streak or appear uneven when applied carelessly; not inhibit the breathing ability of masonry and yet allow full egress of water vapor so that interior moisture can evaporate.

In accordance with the present invention a water repellent treatment has been developed which not only meets all the above requirements but also is effective in preventing efflorescence and suppressing stains. It has also been found that the novel water repellent treatment of the present invention will permit the abrading of the surface of the treated material such as by sandblasting, and other building cleaning methods without decreasing the efficacy of the water repellent qualities of the treated masonry.

In accordance with the present invention nonaqueous solutions of organo-siloxane resins, more commonly known as silicone resins, including mixtures thereof are employed in the masonry treatment of the present invention. It has been found that these resinous polymers and copolymers which when completely condensed have an empirical formula corresponding to the following type formula:

$$(R_mSiO_n)_x$$

where $x$ is an integer greater than one, R represents like and unlike radicals, monovalent alkyl or mono-valent aryl, $m$ is a number less than 2 and not less than approximately .5, and $n$ is a number more than 1 and not more than approximately 1.75. The condensation of the polymers and co-polymers is of the straight chain, heterocyclic and cross linked type and the silicon atoms are linked through the oxygen atoms, while the alkyl or aryl radicals are attached to the silicon atoms. These silicone resins are employed as a solution in the "B" or soluble resinous state dissolved in a non-aqueous organic solvent. After application to the masonry these resins further condense. Part of the solvent may be replaced by a co-solvent or diluent to within the solvent range of the resin to reduce cost or to raise the flash point of the solution. Chlorinated hydrocarbons are useful for this purpose.

The preferred ratio of R to silicon varies with the particular alkyl or aryl (which terms include alkaryl and aralkyl). For example, when methyl is the only organic radical present in the stage B resin, the ratio of R/Si should be maintained between approximately 1.2 and 1.7. Above approximately 1.7 the resin will not properly cure to yield effective water repellent surfaces and below approximately 1.2 the insolubility and rapid curing of the resins are of such values as to render them undesirable for use for effective water repellent treatment. However, all other things constant, as the length of the alkyl chain increases the resin becomes more soft, soluble and easily cured so that for amyl and butyl silicone resins the R/Si ratio may be as low as .5 without becoming too hard and insoluble for use in the present invention. It is to be understood, therefore, that the prefered R/Si range will always be within these limits of "$m$" and "$n$" but that the desirable range for any particular R (whether one organic radical or a mixture of organic radicals) will vary depending upon the number of carbon atoms in the cyclic or chain structure of R. These variations are described in greater detail in "Chemistry of the Silicones," by E. G. Rochow (John Wiley & Sons, Inc., N. Y. C., 1946) page 70 et seq.

The silicone resins of the desired R/Si ratio may be made by any of several processes, three of which are described on page 70 of the above cited book. These processes lend themselves to close control of the R/Si ratio.

The silicone resins are cross linked in order to attain resinous properties and hence the R/Si ratio is always less than two. The following three methods are among those available for preparing the cross-linked resins. For simplicity they will be described as applied to the preparation of methyl silicone resins.

1. Dimethyl silicone may be prepared by hydrolyzing dimethyldichlorosilane or its esters, and then oxidized with air and a catalyst to attain the desired $CH_3/Si$ ratio.

2. Dimethyldichlorosilane may be mixed with methyltrichlorosilane or silicon tetrachloride and then hydrolyzed and the products cocondensed.

3. Silicon tetrachloride may be partially methylated (as with methyl magnesium chloride) to the desired $CH_3/Si$ ratio and then the reaction mixture hydrolyzed directly.

The various methods have particular advantages. For example, the first method has the advantage of direct control of the final viscosity by "bodying" the resin in a solvent. The second method requires that the hydrolysis be carried out in a solvent capable of dissolving both the chlorosilanes and water in order that the resin may remain soluble. The third method is simpler, for the ethyl ether used as solvent for the Grignard reaction also serves as a homogeneous medium for hydrolysis, but control of the composition is more remote.

Similarly, ethyl silicone resins may be prepared. The ethyl group attached to silicon in a polymeric siloxane chain renders the composition softer, more soluble and slower to cure than would a methyl group so that for a given hardness and degree of infusibility and insolubility, fewer ethyl than methyl groups are required. For this reason a preferred range of composition for ethyl silicone resins is from 0.5 to 1.5 ethyl groups per silicon atom.

Similarly, propyl, butyl, and amyl silicone resins may be prepared. The larger alkyl groups cause the resin to cure more slowly and remain softer in consistency. If the larger groups are used fewer are required to produce a resinous polymer of given flexibility and curing characteristics so that a butyl silicone roughly comparable to a methyl silicone in physical properties does not necessarily contain four times as much carbon. Benzyl silicone resins are classed as alkyl silicone resins because the phenyl group is attached through a $CH_2$ group to the silicon. Polybenzylsiloxane derived from the hydrolysis of benzyltrichlorosilane is a sticky soluble resin which gradually condenses further to an insoluble resin. Cyclohexyl silicone resins resemble benzyl silicone resins.

Phenyl silicone resins may be prepared having similar properties to the alkyl silicone resins. The hydrolysis product of phenyltrichlorosilane, for example, is a fusible resin highly cross-linked whose melting point rises with continued heating. Similar properties result from the cocondensation of phenylsilanetriol and diphenylsilanediol to make resins with phenyl-to-silicon ratios between one and two. Xylyl- and naphthylsiloxanes are soluble glassy substances of polymeric character.

Mixtures of alkyl and aryl silicone resins are preferably prepared by attaching both alkyl and aryl groups to the same silicon atom rather than by mere admixture. Alternatively alkyl and aryl silicols may be cocondensed to make a copolymer. The copolymer method has the advantage of flexibility for it permits various combinations of alkyl and aryl groups to be used in different proportions within a single polymeric structure. A wide range of properties may thus be obtained. Some of the alkyl-aryl copolymers have superior properties such as mechanical strength and toughness compared with pure alkyl or aryl silicone resins. A typical resin is methyl phenyl silicone which develops a good balance of flexibility, strength and infusibility. Another example is ethyl phenyl silicone resin which may be made either from ethylphenyldichlorosilane or by cocondensation of mixed ethyl and phenyl chlorosilanes. Other alkyl-aryl silicone resins may be prepared.

The solutions of silicone resins utilized in the present invention may be conveniently and effectively used to produce water-repellent masonry, asbestos shingles, asbestos board, etc. The repellency produced is of a different order of magnitude than that produced by oils, waxes, stearates, stearic acid or other types of organic resins previously utilized for this purpose. A simple method for showing this is to brush a single coat on a porous brick surface so that ⅛" to ¼" penetration is obtained. Where one of the previously utilized oils, waxes, etc., is employed, a large drop of water will stand on the surface with a high angle of contact for a period varying from a few minutes to approximately one-half hour. At that time the water appears to have penetrated the treated area and reached the untreated interior, because it will then be sucked in with great rapidity. The same brick surface treated analogously with one of the solutions employed in the present invention will maintain the drop of water until it evaporates.

The water repellent effect obtained by treatment with the silicone solutions of the present invention is unusually long lived and resistant to removal by rain or deterioration by sunlight or oxidation. After continuous exposure to sunlight and rain, a drop of water will wet the surface, but the interior will remain unchanged as demonstrated by continued resistance to water penetration. This can be further demonstrated by removing the top surface to expose a new surface. This new surface will support a drop of water with as great an angle of contact as when fresh. The water repellency of masonry obtained in accordance with the present invention lasts at least five years and usually lasts indefinitely.

Masonry treated with silicone resin solutions is resistant to stains produced by soluble or insoluble bodies, such as colloidal soot or tar particles, iron or copper hydroxide, or basic carbonates, being carried into the masonry pores. Efflorescence is effectively prevented, since water cannot enter to dissolve the soluble salts in brick and motor.

The silicone resin solutions of the present invention produce water repellency even at high dilutions; at a concentration of as low as 0.10% solids, water repellency is obtained. This makes possible the use of solutions consisting nearly entirely of solvent and which form a very thin film, thereby permitting careless or sloppy application without danger of changing the surface appearance by flushing or streaking or the like.

The processes of the present invention are to be contrasted with vapor phase methods. Vapor phase methods are impractical for the treatment of buildings or large masonry structures and do not provide the effective control which can be exercised with the methods of the present invention.

The following examples are illustrative only.

Example 1

A cross-linked methyl silicone having an R/Si ratio of approximately 1.23:1 is prepared from commercially pure methyltrichlorosilane (4.5423 g.) and dimethyldichlorosilane (1.1577 g.). The silanes are drawn up in Lange tubes, weighed, mixed and discharged in approximately 50 ml. of ether. The ether solution is poured on approximately 100 g. of ice which is somewhat colder than freezing so that it is relatively dry. This is necessary, because if the mixtures are discharged in water a white, powdery material separates as the rate of hydrolysis of trichlorosilane is so much more rapid than that of dichlorosilane that it is hydrolized separately to a completely cross-linked insoluble mass.

The ether solution is separated after the ice is melted, washed free of chlorides in a separatory funnel, and the ether is evaporated at slightly above room temperature. The weighed residue after evaporation is dissolved in a measured amount of toluene from which 1% solution and a 5% solution are prepared.

The 1% solution is applied to a masonry surface by brushing. After air drying at ambient temperatures for approximately two weeks or at 140° F. for five days full effectiveness for excellent waterproofing is obtained. The 5% solution after air drying gives a similar excellent waterproofing.

Example 2

Example 1 was repeated, the only difference being that the R/Si ratio is adjusted to a value of 1.61:1 by using 2.1613 g. of methyltrichlorosilane and 2.9906 g. of dimethyldichlorosilane.

A 1% and 5% solution are prepared. Each solution is applied in one coat on one side of red face brick by brushing. After five days of air drying at 140° F. or two weeks of air drying at ambient temperatures full effectiveness as a water repellent coating was obtained.

Example 3

Example 1 was repeated, but the R/Si ratio was adjusted to a value of 1.68:1 by employing 1.7355 g. of methyltrichlorosilane and 3.1856 g. of dimethyldichlorosilane.

Full effectiveness as a water repellent coating was obtained after five days of drying at 140° F. or two weeks at ambient temperatures.

It is to be understood that silicone resins other than the above may be utilized to form effective water repellent compositions. For example, mixtures of aryl and higher alkyl silicones are likewise useful.

It is to be understood that the term masonry as employed herein includes all inorganic non-metallic materials which are porous to water, such as asbestos shingles, asbestos board, brick, concrete, mortar, stone, stucco and the like.

In lieu of the toluene used as a solvent for the silicone resin of the examples, xylene, trichloroethylene, coal tar or illuminating gas, high flash naphtha, benzene, or carbon tetrachloride may be utilized.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

I claim:

A process of rendering porous masonry structures water repellent including the steps of applying to such masonry structures a dilute liquid comprising a solution in an organic solvent of a silicone resin in its B-stage partially condensed form, wherein the concentration of the silicone resin is from about .1 to 5 parts by weight of the silicone resin to 99.9 to 95 parts by weight of the organic solvent, said silicone resin when completely condensed being a heterocyclic and cross-linked condensation product having the formula $(R_mSiO_n)_x$, where $x$ is an integer greater than one, R represents radicals some of which may be unlike, selected from the group consisting of monovalent alkyl and monovalent aryl radicals, $m$ is a number less than two and not less than approximately .5, and $n$ is a number more than one and not more than approximately 1.75, the silicon atoms in the resin being linked to the oxygen atoms and the alkyl and aryl radicals being attached to the silicon atoms; to effect a substantial penetration of the solution into and below the surface of the masonry, and, by permitting the treated masonry to dry to remove the solvent, leaving a thin deposit of the silicone resin on the portions of the masonry penetrated, without closing the pores thereof.

BAYARD R. BRICK.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,386,259 | Norton | Oct. 9, 1945 |
| 2,398,672 | Sauer | Apr. 16, 1946 |
| 2,408,822 | Tanis | Oct. 8, 1946 |
| 2,456,627 | Doyle | Dec. 21, 1948 |

FOREIGN PATENTS

| Number | Country | Date |
|---|---|---|
| 116,470 | Australia | Jan. 19, 1943 |